No. 762,136. PATENTED JUNE 7, 1904.
A. B. CAMPER.
COMPUTING SCALE.
APPLICATION FILED AUG. 24, 1903.
NO MODEL. 2 SHEETS—SHEET 2.
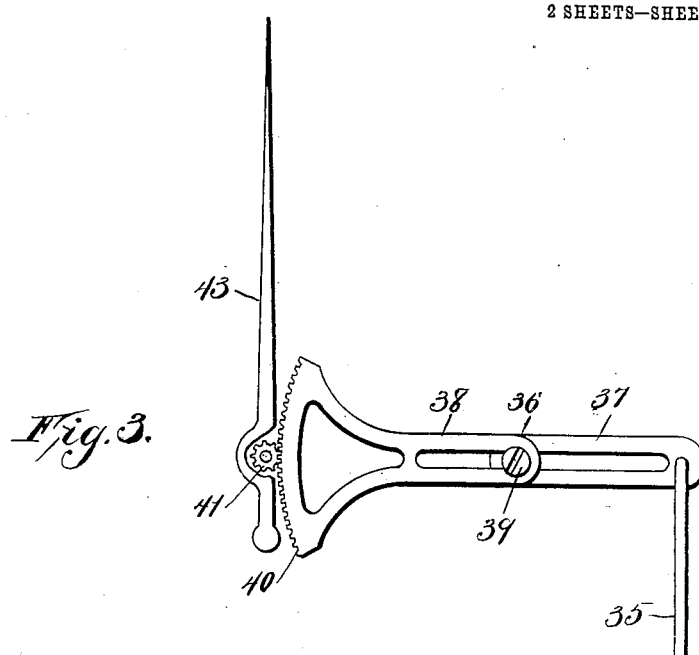
Fig. 3.
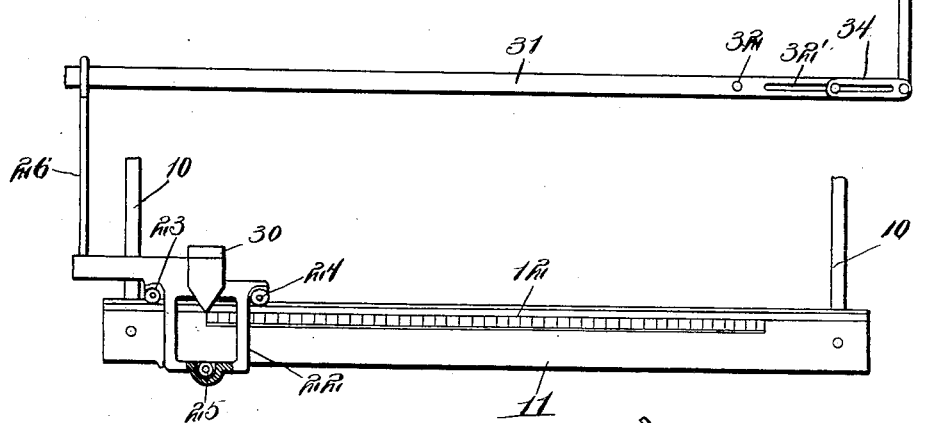
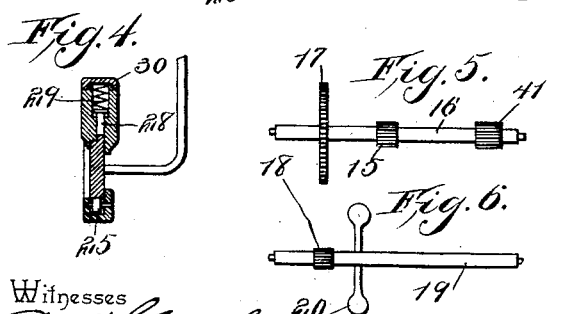
Fig. 4. Fig. 5. Fig. 7.
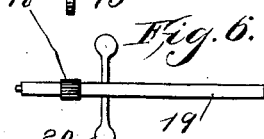
Fig. 6.
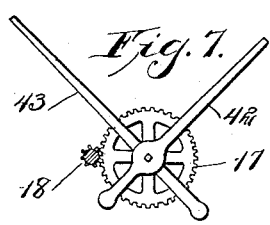
Witnesses
E. T. Stewart
Baxter Morton
A. B. Camper, Inventor.
by C. A. Snow & Co.
Attorneys
THE NORRIS PETERS CO., PHOTO-LITHO., WASHINGTON, D. C.

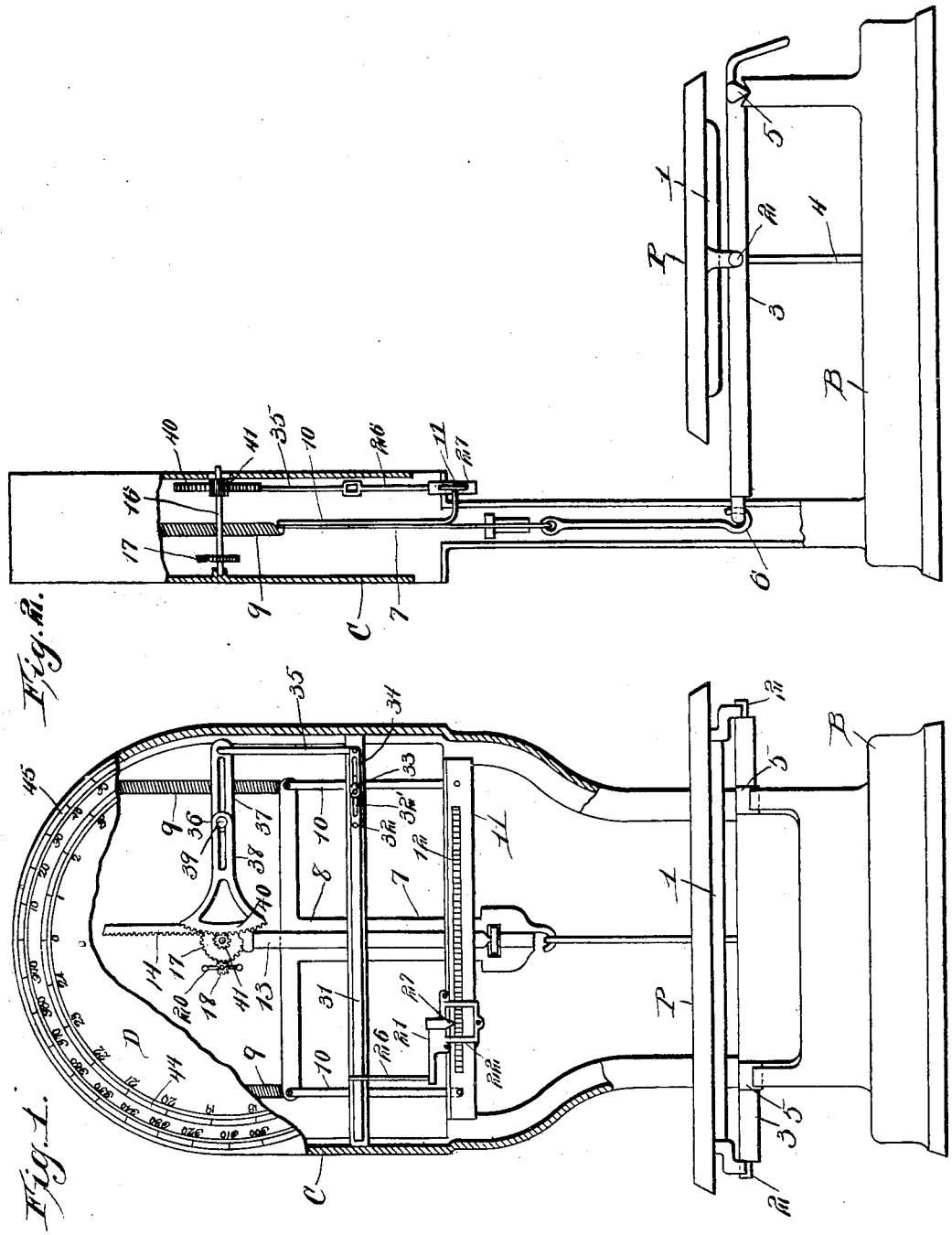

No. 762,136. Patented June 7, 1904.

UNITED STATES PATENT OFFICE.

ALBERT B. CAMPER, OF ROANOKE, VIRGINIA.

COMPUTING-SCALE.

SPECIFICATION forming part of Letters Patent No. 762,136, dated June 7, 1904.

Application filed August 24, 1903. Serial No. 170,634. (No model.)

*To all whom it may concern:*

Be it known that I, ALBERT B. CAMPER, a citizen of the United States, residing at Roanoke, in the county of Roanoke and State of Virginia, have invented a new and useful Computing-Scale, of which the following is a specification.

This invention relates to computing-scales, and more particularly to that type of computing-scale in which two pointers are actuated by suitable mechanism when a quantity of any material is placed on the scale-platform to indicate upon a suitably-marked dial the weight of the material and the value thereof when the price per pound has been noted by a suitable price-indicator upon a graduated scale provided for that purpose.

The object of the invention is to provide in a computing-scale of the type specified a simple mechanism which will be positive in operation and not easily deranged by means of which the value of goods to be sold by weight may be accurately determined with great facility by merely setting at the proper point upon the scale of prices per pound a suitable indicator.

A further object of the invention is to provide in a computing-scale of the type specified means for bringing the weight and value indicating hands to rest quickly, and so avoiding the loss of time which is occasioned in most computing-scales of the type to which this invention relates by the vibration of the hands or pointers which move over the dial.

The invention consists in the combination and construction of parts of a computing-scale, as hereinafter described, illustrated in the accompanying drawings, and having the novel features thereof specifically pointed out in the appended claims.

In the drawings, Figure 1 is a view in front elevation of a scale constructed in accordance with this invention, part of the scale-casing and dial being broken away to show the internal construction of the scale. Fig. 2 is a view in side elevation of the scale with a part of the casing removed. Fig. 3 is a detail view from the front of the value-computing mechanism detached from the rest of the scale structure. Fig. 4 is a detail view in section, showing the construction of the price-scale and the indicating-slide which moves thereon. Figs. 5, 6, and 7 are detail views showing the means for actuating the weight and value indicating pointers and the counterbalance-shaft by which they are brought to rest.

Referring in detail to the drawings, in which corresponding parts are designated by the same characters of reference throughout, B designates generally the base of the scale, at one end of which rises a vertical casing designated generally as C.

P is the platform, which is suitably supported upon a member 1, resting upon trunnions 2 at the sides of a circular frame 3 and held in horizontal position by means of suitable mechanism, (not shown,) which connects with the end of a pendent stem 4. The frame 3 is supported at one margin upon a knife-edge 5 of the ordinary type and at the opposite side is supported by a hook 6, suspended from the bottom of a frame designated generally as 7 and comprising the T-shaped member 8, each end of which is supported by a spiral spring 9, the vertical members 10, riveted to the T-shaped member just beneath the springs 9, as shown, and the transverse member 11, supported by the vertical members 10 and graduated, as best seen in Fig. 3, to form a scale 12 of prices per pound. Extending upward from the frame 7 at the middle thereof is a vertical arm 13, the upper portion of which is formed into a rack 14 for engagement with a small pinion 15, which is rigidly secured upon the horizontally-disposed shaft 16, which is mounted in bearings at the front and rear of the casing. The shaft 16 is provided near its rear end with a gear 17, also rigidly mounted thereon, which is in mesh with a small pinion 18 upon a shaft 19, parallel with the shaft 16 and provided with a dumb-bell-shaped weight 20, whose utility will presently be pointed out.

Slidably mounted upon the transverse bar 11 to coöperate with the price-scale 12, formed thereon, is an indicator-slide 21, comprising a frame 22, rollers 23, 24, and 25, arranged so as to prevent vibration of the slide on the bar, while permitting free movement longitudinally of the bar, the vertical arm 26, rising from the frame 22 and provided with an eye for engagement with a lever-arm presently to be described, the pointer 27, and the spring-pressed plunger 28, by means of which the slide is held at any desired point upon the bar 11. The plunger 28 is mounted in a suitable opening in the frame 22, as shown in Fig. 3, and is depressed by means of a spring 29, which is held in place by a screw-cap 30, which is secured upon the top of the frame 22. The vertical arm 26 is provided at its upper end with an eye, as stated in a preceding sentence, and this eye is slipped over the end of a lever 31, pivotally mounted at 32 upon a pivot-pin arranged transversely of the casing C and slotted at 32' for the passage of a small bolt 33, by means of which there is secured to the end of the lever a slotted extension member 34. By means of the extension member 34 and the bolt 33 the length of the lever may be accurately adjusted as required. At the end of the extension member 34 there is hinged a link or rod 35, the upper end of which is hinged to a lever 36, made up of two slotted sections 37 and 38, united by an adjusting-screw 39 at their pivotal point. The member 38 is formed into a segmental rack 40 at the end, and this rack is in mesh with a small pinion 41, loosely mounted upon the shaft 16.

The front end of the shaft 16 projects beyond the pinion 41 and is squared, as shown in Fig. 5, for engagement with a squared opening in a small hand or pointer 42. A similar hand or pointer 43 is associated with the loose pinion 41, and both of the hands move over a dial D, provided near its periphery with concentric scales 44 and 45, the former or inner scale being that on which weights are indicated and the latter or outer scale being that on which values are shown.

As will have been readily seen from the foregoing description, the small hand 42 will be caused to move over the scale 44 when a weight is placed in the pan P and the frame 7 is drawn downward thereby. The downward movement of the frame 7 produces, of course, a corresponding movement in the vertical arm 13, and the rack thereon causes a rotation in clockwise direction of the pinion 15 and small shaft 16 upon which the hand 42 is mounted. The movement of the hand 43 will depend upon the position of the slide 21 on the bar 11, its movement being least when the slide is at the left end of the bar and being greatest when the slide is at the right end, as will be readily seen, since the effective length of the lever-arm upon which the vertical arm of the slide pulls is greatest when the slide is at the left end of bar 11 and least when the slide is at the opposite end; but whenever the platform is depressed by a weight placed thereon the hand 43 will be caused to move over the scale 45, and the magnitude of its travel will be proportionate to the number on the scale 12 at which the slide 21 is set.

The shaft 19, with the counterweight 20, is provided in order to act as a brake upon the oscillatory movement of the frame 7 when a weight is placed in the platform, and thus to bring the hands 42 and 43 to rest over the scales 44 and 45 as quickly as possible.

As the exact manner of connecting the parts of the apparatus and of supporting the shaft therein forms no part of this invention, detailed illustration of the bearings and other minor features of construction have been omitted for the sake of brevity.

It is to be understood that while the preferred form of embodiment of the invention has been described and illustrated various changes in the form, proportions, and exact manner of assemblage of the parts of the mechanism may be made without departing from the spirit of the invention or sacrificing its advantages, and the right to make such changes within the scope of the appended claims is therefore reserved.

Having thus described the construction and operation of my invention, what I claim as new, and desire to secure by Letters Patent, is—

1. The combination in a computing-scale, of a dial graduated to indicate weights and values, hands movable over said dial to indicate weights and values, a platform, means operated by descent of the platform to impart movement to the weight-indicating hand proportional to the movement of the platform, a graduated horizontal bar mounted for movement with the platform, a price-indicator slidably mounted on said bar, a lever disposed parallel to said bar, a vertical arm on the price-indicator engaging said lever, and connections between said lever and the value-indicating hand whereby a movement of said hand proportional to the movement of said lever is brought about.

2. The combination in a computing-scale, of a dial bearing value and weight graduations thereon, value and weight indicating hands movable over said dial, a vertically-movable platform, connections between said platform and the weight-indicating hand causing movement of said hand proportional to that of platform, a graduated horizontal bar movable with said platform, a price-indicator slidable on said bar and having a vertical arm, a lever engaged by said arm normally parallel with said bar, means on said price-indicator for securing it in adjusted position, and connections between said lever and the value-indicating hand whereby movement of said hand proportional to the movement of said lever results.

3. The combination in a computing-scale, of a dial graduated to indicate values and weights, a shaft at the center of said dial bearing a weight-indicating hand and having a pinion rigidly secured thereto, a vertically-movable platform, a rack connected with said platform, and in mesh with said pinion, a graduated horizontal bar mounted for movement with said platform, a price-indicating slide mounted on said bar and having a vertical arm, a lever engaged by said arm and normally parallel with said bar, a value-indicating hand movable over said dial and connections between said value-indicating hand and said lever whereby movement of said hand proportional to the movement of said lever results.

4. The combination in a computing-scale, of a dial graduated to indicate weights and values, hands movable over said dial, a vertically-movable platform connected with one of said hands to impart movement thereto proportional to the movement of the platform, a graduated horizontally-disposed bar mounted for movement with said platform, a price-indicator slide mounted on said bar and having a vertical arm, an extensible lever engaged by said arm and normally parallel with said bar, and connections between said lever and one of said hands whereby movement of said hand proportional to the movement of the lever results.

5. The combination in a computing-scale, of a dial graduated to indicate weights and values, hands movable over said dial, a vertically-movable platform, connections between said platform and the weight-indicating hand, a graduated horizontal bar mounted for movement with said platform, a price-indicator slide mounted on said bar and having a vertical arm, a lever engaged by said vertical arm and held normally parallel with said bar, connections between said lever and one of said hands, whereby movement of said hand proportional to the movement of said lever results, and a weighted shaft to which rotary movement is imparted by the vertical movement of said platform.

6. The combination in a computing-scale, of a vertically-movable platform, a graduated horizontal bar mounted for movement therewith, a price-indicator slide mounted on said bar and provided with an arm, a pivoted lever engaged by said arm and held normally parallel with said bar, a member having a surface graduated to indicate weights and values, members movable over said surface, direct connections between one of said members and said platform, and connections between the other of said members and said lever whereby movement of said member proportional to the movement of said lever results.

In testimony that I claim the foregoing as my own I have hereto affixed my signature in the presence of two witnesses.

ALBERT B. CAMPER.

Witnesses:
N. W. PHELPS,
THOS. L. ENGLEBY.